United States Patent [19]

Inagaki

[11] Patent Number: 4,468,865
[45] Date of Patent: Sep. 4, 1984

[54] COLD AIR MICROWAVE DRYING APPARATUS

[75] Inventor: Makoto Inagaki, Tokyo, Japan

[73] Assignee: Techno Venture Co., Ltd., Tokyo, Japan

[21] Appl. No.: 304,985

[22] Filed: Sep. 23, 1981

[30] Foreign Application Priority Data

Oct. 7, 1980 [JP] Japan ............... 55-142346[U]

[51] Int. Cl.³ ............................................. F26B 23/08
[52] U.S. Cl. ................................................ 34/1; 34/54;
34/68; 219/10.55 R; 99/451; 426/235; 426/242
[58] Field of Search ................... 34/1, 68, 233, 54;
219/10.55 R, 10.55 M; 426/235, 242, 243;
99/451; 137/625.28, 601, 614.11; 251/212;
98/40 VM, 41 R

[56] References Cited

U.S. PATENT DOCUMENTS

| | | | |
|---|---|---|---|
| 2,836,191 | 5/1958 | Wallin et al. | 251/212 |
| 2,952,078 | 9/1960 | Litzler | 34/54 |
| 3,277,580 | 10/1966 | Todby | 34/1 |
| 3,513,567 | 5/1970 | Paul | 34/54 |
| 3,676,058 | 7/1972 | Gray | 99/451 |
| 3,889,009 | 6/1975 | Lipoma | 426/243 |
| 4,154,861 | 5/1979 | Smith | 426/243 |
| 4,208,806 | 6/1980 | Manser et al. | 34/1 |

Primary Examiner—Larry I. Schwartz
Attorney, Agent, or Firm—Burgess, Ryan & Wayne

[57] ABSTRACT

A drying apparatus employing adjustment baffles for cold air that is blown vertically upward from below a moving mesh belt, thereby achieving a uniform delivery of said cold air within a chamber heated by microwave energy.

2 Claims, 4 Drawing Figures

COLD AIR MICROWAVE DRYING APPARATUS

BACKGROUND OF THE INVENTION

The present invention relates to a drying apparatus using combined microwave heating and air flow for drying food products rapidly while maintaining their flavor and providing them with improved shelf life.

Conventional methods for accomplishing the drying of foods include air-drying, freeze-drying, microwave heating, etc. However, the use of any of these techniques by itself has certain disadvantages. Such disadvantages include the requirement of much time to achieve the desired drying, deterioration of the quality of the food product, and high operating costs.

For instance, the microwave heating method operates on the principle of causing heating on the basis of a dielectric loss in the material being heated, and is characterized by the inside of the material being heated as well as the outside, which is in contrast to the case of the ordinary heating techniques which heat from the outside of the material. However, the microwave heating technique also results in the occurrence of heat degeneration of the food product as the temperature increases, and when microwave heating is employed alone, there is the drawback of the operating cost being too high.

Conversely, in the case of using only the air-drying method to reduce the moisture content of food products, a big problem is that there is poor evaporation of the moisture from the internal regions of the food material. For this reason, a long time is required to accomplish the desired degree of drying, and the productivity is low.

Accordingly, an object of the present invention is to provide an arrangement for drying food products with minimal heat degradation thereof.

SUMMARY

As herein described, there is provided an apparatus for drying food products, comprising a drying chamber having a product inlet port, a product outlet port, and a movable foraminous belt for transporting food products through said chamber in a horizontal direction between said inlet and outlet ports; waveguide means for directing microwave energy toward said belt to heat food products thereon; a cold air inlet port; baffle means disposed intermediate said cold air inlet port and said belt and below said belt for substantially uniformly directing cold air upwardly through said belt to dry food products thereon; and sealing means for restricting the emission of microwave radiation from said product inlet and outlet ports.

IN THE DRAWING

DETAILED DESCRIPTION

Figure 1:
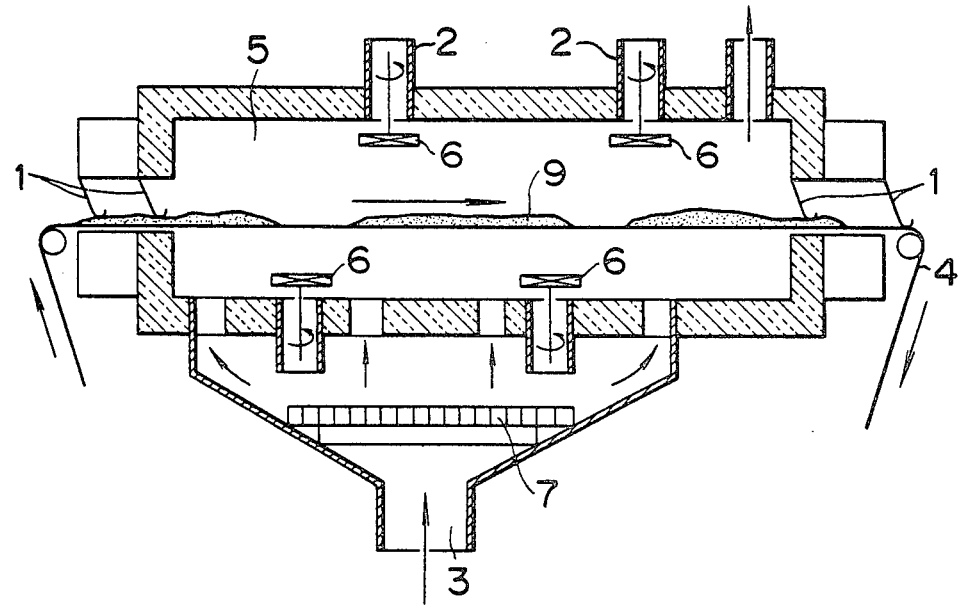
FIG. 1 is a side elevation cross-sectional view of a combined microwave—cold air drying apparatus according to a preferred embodiment of the invention.
Figure 2:
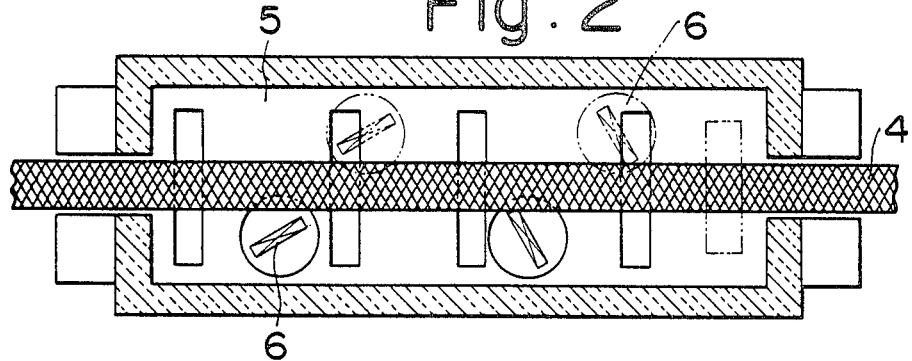
FIG. 2 is a plan cross sectional view thereof.

The apparatus shown in the drawing is designed for the purpose of achieving drying of food products while preventing heat degeneration of the food material. This objective is achieved by combining the use of circulating cold air and microwave heating, thereby keeping the food at a relatively low temperature. This design was based on the results of an investigation carried out to determine what air-drying conditions were necessary to bring about increased productivity.

In said investigation, a comparison was made of the drying efficacy of two different air-drying methods: in one method the flow of the air was parallel to the surface of the food product being dried, while in the other method the air flow was perpendicular to the food product surface. In the test system, small fish were placed on a horizontal metal wire mesh screen to a depth of about 1 cm for air-drying. Air-drying was carried out using a flow rate (in the delivery duct) of 1 meter/sec for air that was delivered perpendicular to the fish, and 3 meters/sec when the air flow was parallel to the fish.

The results showed that, to achieve the same degree of drying, the vertical air-flow treatment required only $\frac{1}{3}$ to $\frac{1}{2}$ of the time needed with the parallel air-flow method; and in addition, the drying of the treated material with the vertical air flow was uniform. In contrast to this, the parallel air-flow drying system resulted in a large amount of variation in the degree of drying that was achieved, and it was not possible to obtain uniformly dried products.

Accordingly, in the above manner, it was discovered that, when drying food products which possess a certain degree of thickness and have crevices, air-drying can be much more effectively accomplished by delivering a vertical (or perpendicular) flow of air to the product than by using a flow of air that is parallel to the surface of the material to be dried.

It is desirable to achieve this perpendicular flow of air by uniformly delivering an upwardly directed air stream from below the microwave heating chamber, so that the air enters the chamber. For this purpose a crosswork, lattice-like structure composed of a number of adjustable baffles in two layers (the number of such layers can be greater than two) is preferably employed, with uniform delivery of the air flow being achieved by adjusting the angle of the baffles.

As shown in FIG. 1, the food product 9 to be dried is placed on a foraminous mesh belt 4 which passes between inlet and outlet ports of the chamber 5 via the microwave shields 1 (intended to prevent leakage of the microwaves from the chamber 5), the food being thus delivered to a position where it is heated by microwaves radiated downwardly via the waveguides 2. The microwaves passing through the waveguides 2 are stirred by the field stirrers 6 so that standing waves are broken up and the microwave energy is caused to uniformly strike the material 9 to be dried.

Internal heat generated in the food product 9 by the microwave energy causes the rapid diffusion of internal moisture to the surface of the material being dried.

Cold air is delivered to the food product 9 from below the belt 4 through the cold air inlet port 3, passes upward through the air-flow adjustment baffles 7, and is thus uniformly delivered to the microwave heating chamber 5, where the cold air brings about the drying of the material being treated.

This combination of microwave heating and uniform cold air delivery perpendicular to the food product surface achieves a much higher drying rate than is possible with cold air drying alone.

The air flow adjustment is accomplished by means of elongated rectangular individually rotatable adjustment baffles 8 (see FIGS. 3A and 3B) that are included in the frame of the air-flow adjustment device 7 and which have an orthogonal relationship to each other. The angles of rotation of these baffles are adjusted in order to achieve the proper uniform delivery of the cold air to the microwave heating chamber 5.

Figure 3A:
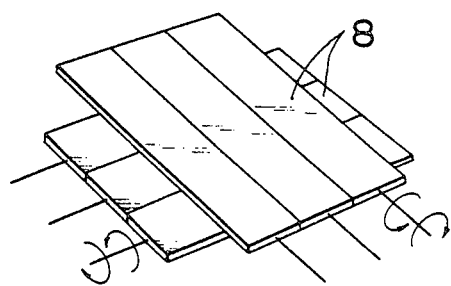
FIGS. 3A and 3B are perspective views showing the baffle means utilized in said apparatus in their fully closed and fully open positions respectively.
Figure 3B:
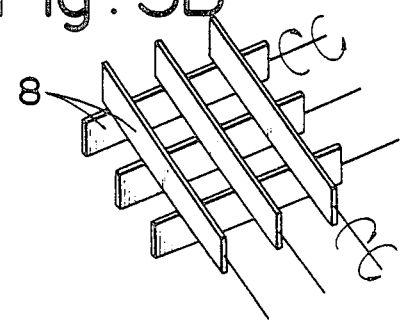

As shown in FIG. 3A, the adjustment baffles 8 would block the flow of air into the heating chamber if they were made to lie flat; whereas when they are adjusted to a vertical or standing position, as shown in FIG. 3B, the air flow would be free to pass into the chamber. By suitably adjusting the angle of each of the baffles in their crosswork matrix, it is possible to deliver a uniform flow of cold air into the heating chamber.

This procedure allows, at a low temperature, accelerated elimination of water from the surface of the material being dried. And this, in turn, makes it possible to achieve the drying of the material without heat degradation or decomposition thereof; and the material can be quickly dried to the desired moisture level.

Thus, by means of the combination of use of an orthogonal flow of cold air and microwave heating, the present apparatus is able to dry food materials efficiently while maintaining their good flavor.

We claim:

1. Apparatus for drying food products, comprising a drying chamber having a product inlet port, and a product outlet port;
   a movable foraminous belt for transporting food products through said chamber in a horizontal direction between said inlet and outlet ports;
   waveguide means for directing microwave energy toward said belt to heat food products thereon;
   a cold air inlet port below said chamber;
   adjustable baffle means disposed intermediate said cold air inlet port and said belt and below said belt for substantially uniformly directing cold air upwardly through said belt to dry food products thereon, said baffle means comprising a plurality of individually adjustable orthogonal baffles; and
   sealing means for restricting the emission of microwave radiation from said product inlet and outlet ports.

2. Apparatus according to claim 1, further comprising rotatable stirring means for disrupting standing waves to uniformly direct said microwave energy toward said belt.

* * * * *